(12) United States Patent
Suriyal et al.

(10) Patent No.: US 12,452,934 B2
(45) Date of Patent: Oct. 21, 2025

(54) WIRELESS PACKET FOR ACTIVATING A WIRELESS LOCAL AREA NETWORK CAPABILITY ON A USER DEVICE

(71) Applicant: HEWLETT PACKARD ENTERPRISE DEVELOPMENT LP, Spring, TX (US)

(72) Inventors: Shailendra Singh Suriyal, Bangalore (IN); Nagendra Babu Rapaka, Bangalore (IN); Ravi Suhane, Bangalore (IN); Amit Agrawal, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 341 days.

(21) Appl. No.: 18/451,488

(22) Filed: Aug. 17, 2023

(65) Prior Publication Data

US 2024/0422836 A1 Dec. 19, 2024

(30) Foreign Application Priority Data

Jun. 15, 2023 (IN) .............................. 202341040805

(51) Int. Cl.
*H04W 76/10* (2018.01)
*H04W 84/12* (2009.01)
(52) U.S. Cl.
CPC ............ *H04W 76/10* (2018.02); *H04W 84/12* (2013.01)
(58) Field of Classification Search
CPC .............................. H04W 76/10; H04W 84/12
See application file for complete search history.

(56) References Cited

U.S. PATENT DOCUMENTS

| | | | |
|---|---|---|---|
| 9,820,105 B2 | 11/2017 | Snyder et al. | |
| 9,980,140 B1 | 5/2018 | Spencer et al. | |
| 10,681,152 B2 | 6/2020 | Kim et al. | |
| 10,798,702 B2 | 10/2020 | Amini et al. | |
| 10,966,073 B2 | 3/2021 | Petersen | |
| 11,038,757 B2 | 6/2021 | Panje | |
| 2017/0180917 A1* | 6/2017 | Steiner | H04W 64/00 |
| 2017/0353867 A1* | 12/2017 | Baboescu | H04L 27/2614 |
| 2019/0072638 A1 | 3/2019 | Wang et al. | |
| 2021/0014710 A1 | 1/2021 | Raju | |

FOREIGN PATENT DOCUMENTS

| | | | | |
|---|---|---|---|---|
| WO | WO-2013184110 A1 * | 12/2013 | ............ | H04W 48/14 |
| WO | 2016/041440 A1 | 3/2016 | | |
| WO | 2020/105046 A1 | 5/2020 | | |

\* cited by examiner

*Primary Examiner* — Christopher R Crompton
(74) *Attorney, Agent, or Firm* — Hewlett Packard Enterprise Patent Department (57) ABSTRACT

Some examples relate to using a wireless packet for activating a wireless local area network capability on a user device. In an example, a user device receives a wireless packet comprising carrier network identification information from a low energy wireless broadcast enabled access point of a carrier network. In response to determining that the carrier network identification information in the wireless packet matches with carrier network information on the user device, the user device provides a notification message to activate a wireless local area network capability on the user device. After the wireless local area network capability is activated, the user device establishes a network connection with the access point and access the wireless local area network of the carrier network via the network connection.

20 Claims, 6 Drawing Sheets

WIRELESS PACKET FOR ACTIVATING A WIRELESS LOCAL AREA NETWORK CAPABILITY ON A USER DEVICE

BACKGROUND

Wireless communication is the transmission of information (e.g., voice or data) without cable or wires. In place of a physical connection, wireless communication involves the transfer of information with the help of electromagnetic waves. Types of wireless communication include, for example, infrared (IR) communication, Wi-Fi, Bluetooth, satellite communication, or cellular communication.

BRIEF DESCRIPTION OF THE DRAWINGS

For a better understanding of the solution, examples will now be described, with reference to the accompanying drawings, in which.

DETAILED DESCRIPTION

Wireless communications permit services, such as mobile communication or satellite communication, that are impractical to implement with the use of wires. Wireless communications commonly refer to telecommunications systems (e.g., radio transmitters or receivers) that use some form of energy (e.g., radio waves or acoustic energy) to transfer information without the use of wires. Information is transferred in this manner over both short and long distances.

Cellular communications have experienced an evolution from analog communications systems (also called 1G) to Global Systems for Mobile Communications (GSM, also called 2G), third generation (3G), fourth generation (4G, wireless broadband, or long-term evolution (LTE)), and the fifth generation (5G).

The shift from wired to wireless technology, including the proliferation of wireless devices such as cell phones, pagers, laptops, tablets, and the like has led to an increasing demand from users to stay connected. Apart from voice communication, users are using wireless networks for sending and receiving a large amount of data. Wireless communication has changed the way users communicate and gather information by making just-in-time and real-time information accessible. It is not surprising therefore that users are increasingly preferring high-speed, always-on connections. Considering the user demand, the carrier networks are also trying to identify various ways for users to stay "online" around the clock.

In one example, when a user device on a cellular network of a carrier comes to a location with limited cellular connectivity but with an access point (AP) beaconing a wireless local area network (e.g., Wi-Fi) of the same carrier network, the user device can be automatically connected to the wireless local area network of the same carrier network if the device's wireless local area network capability is already on. The user device can then use the wireless local area network for making calls or accessing the internet. However, if the wireless local area network capability is not enabled on the user's device, the user device is not notified of the wireless local area network's availability from the same carrier network and is unable to leverage the wireless local area network to make calls or access the internet. This is not a desirable scenario.

Proposed is a solution that leverages a low energy wireless broadcast to notify a user device of a wireless local area network (e.g., Wi-Fi) availability from the user device's carrier network. As used herein, the term "low energy wireless broadcast" refers to the wireless transmission of data packets by utilizing low power (less than 0.50 W). An example of a low energy wireless broadcast includes a broadcast using Bluetooth Low Energy (BLE) technology.

In an example implementation, a user device can receive a low energy wireless packet comprising carrier network identification information from an access point of a carrier network at a location with limited cellular connectivity of the carrier network. The user device can determine whether the carrier network identification information in the low energy wireless packet matches with carrier network information (e.g., in Subscriber Identification Module (SIM)) on the user device. In response to determining that the carrier network identification information in the low energy wireless packet matches with carrier network information on the user device, the user device can provide a notification message to activate a wireless local area network capability on the user device. The user device can then determine whether the wireless local area network capability on the user device has been activated (e.g., via user input). If the wireless local area network capability has been activated, the user device can establish a network connection with the low energy wireless broadcast enabled access point of the carrier network through a wireless local area network (e.g., Wi-Fi). The user device can then access the wireless local area network of the carrier network via the network connection.

The proposed solution provides seamless network connectivity to a user's device. Even when a user device on a cellular network of a carrier comes to a location with limited cellular connectivity, the user device can leverage a wireless local area network of the same carrier network to make calls or access the internet by processing a simple notification message. This provides a better user experience to a user and can incentivize the user to continue using the same carrier network. To illustrate via an example scenario, if a user driving a car and listening to music on a mobile device (via a wireless broadcast technology such as Bluetooth) moves into a location (e.g., a parking lot) with limited cellular connectivity from the user's carrier network, the proposed solution can send a notification message (via a low energy wireless broadcast enabled AP) to the mobile device to turn on the wireless local area network capability. Once the wireless local area network capability is enabled, the user device can be connected to a wireless local area network of the carrier network and continue using the network.

The proposed notification-based solution can be also easily adopted by less technology-savvy users who may otherwise find it challenging to navigate multiple steps to enable a wireless local area network capability on a user device. The proposed solution also benefits a carrier network that can offload network congestion from the carrier's cellular network to the carrier's wireless local area network.

Figure 1:
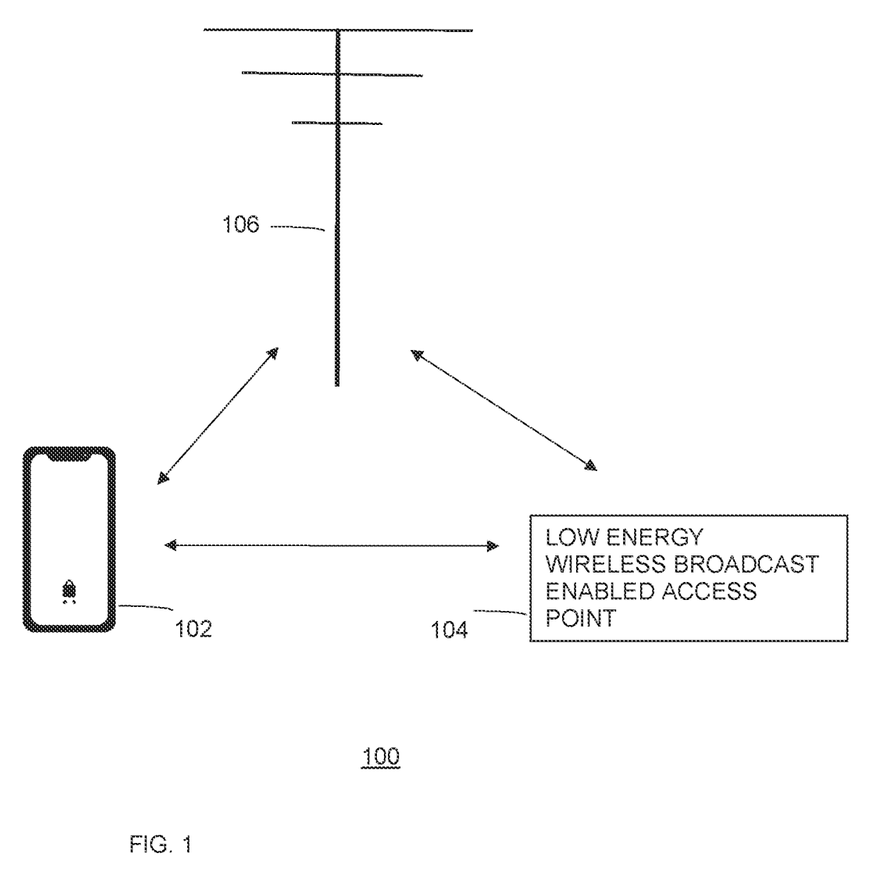
FIG. 1 is a block diagram of a computing environment for using a low energy wireless packet for activating a wireless local area network capability on a user device, according to some examples.

Referring now to the figures, FIG. 1 is a block diagram of a computing environment 100 that includes a user device 102, an access point (AP) 104, and a carrier network 106. In the example of FIG. 1, one access point is depicted for simplicity. In some examples, computing environment 100 may include a different number of access points.

The user device 102 can include a mobile phone, a workstation, a desktop computer, a notebook computer, a tablet computer, a thin client, or any other processing device. The user device 102 can include carrier network information. The carrier network information refers to information (e.g., name of carrier network 106 (e.g., AT&T™ or Vodafone™)) used to identify a carrier network 106. In some examples, the carrier network information can be included in a Subscriber Identification Module (SIM) on the user device 102. A "Subscriber Identification Module" refers to an integrated circuit (IC) intended to securely store an international mobile subscriber identity (IMSI) number and its related key, which are used to identify and authenticate subscribers on mobile telephony devices (e.g., a mobile phone or laptop). A SIM can store information used to authenticate and identify subscribers on the network. For example, a SIM can include a unique serial number (ICCID), international mobile subscriber identity (IMSI) number, security authentication and ciphering information, temporary information related to the local network, a list of the services a user has access to, and passwords. A SIM can also store other carrier-specific data such as the SMSC (Short Message service center) number, service provider name (SPN), service dialing numbers (SDN), and value-added service (VAS) applications. Alternative approaches can also be used to provide carrier network information to user devices.

The user device 102 can include a wireless local area network capability, which allows the user device 102 to communicate (e.g., send and/or receive data (e.g., audio, video, or text)) using a wireless local area network such as Wi-Fi. As used herein, the term "wireless local area network" refers to a wireless computer network that links two or more devices using wireless communication to form a local area network (LAN) within a limited area such as a home, school, campus, or office building. Wi-Fi is an example of wireless local area network technology.

Wi-Fi includes a family of wireless network protocols based on the IEEE 802.11 family of standards, which are used for local area networking of devices and internet access, allowing nearby digital devices to exchange data by radio waves. Wi-Fi allows devices such as computers (e.g., laptops and desktops), mobile devices (e.g., smartphones and wearable devices), and other equipment (e.g., printers) to interface with the internet. Wi-Fi allows these devices to exchange information with one another over a network.

As mentioned earlier, the computing environment can include one or more low energy wireless broadcast enabled access points (e.g., 104). As used herein, the term "access point" refers to a wireless network device that acts as a portal for devices to connect to a local area network. The access point 104 can connect directly to a wired local area network (e.g., Ethernet), and the access point 104 can then provide wireless connections using a wireless LAN technology (e.g., Wi-Fi) for other devices to use that wired connection. The access point 104 can support the connection of multiple wireless devices.

In an example, the access point 104 can include a low energy wireless broadcast device. Such an access point 104 can be referred to as a "low energy wireless broadcast enabled access point". The terms "access point" and "low energy wireless broadcast enabled access point" are used interchangeably in this document. The term "low energy wireless broadcast device" refers to a device that is used to broadcast low energy wireless packets. The term "low energy wireless packet" refers to a data packet used by a low energy wireless broadcast device for advertising and/or data transmission. An example of a low energy wireless broadcast device includes a Bluetooth Low Energy (BLE) beacon. The term "Bluetooth Low Energy (BLE) beacon" refers to a beacon that communicates via Bluetooth Low Energy. A BLE beacon can include a radio transmitter that is used to broadcast low-energy Bluetooth signals in a given range. The range depends on hardware capability.

The term "Bluetooth Low Energy (BLE)" refers to low power (as compared to Bluetooth technology), short-range, wireless personal area network technology. BLE is a power-conserving variant of Bluetooth, which is a short-range wireless technology standard that is used for exchanging data between fixed and mobile devices over short distances and building personal area networks. Bluetooth uses 1 Watt of power. BLE can use between 0.01 and 0.5 Watts. This means that some BLE devices use 100 times less power. Bluetooth can have a range of up to 10 meters. Bluetooth can be used as an alternative to wire connections, for example, to exchange files between nearby portable devices and connect mobile phones and music players with wireless headphones. Both the user device 102 and the access point 104 can include Bluetooth and/or BLE capability that allows the user device 102 and the access point 104 to communicate using Bluetooth and/or BLE.

In an example, the user device 102 can be connected to the carrier network 106. As used herein, the term "carrier network" refers to a telecommunications network comprising a collection of devices and underlying infrastructure used to transmit data from one location to another. The carrier network 106 can include, for example, a 2G network, a 3G network, a 4G network, a long-term evolution (LTE) network, or a 5G network.

In an example, the carrier network 106 can include two component networks: a radio access network (RAN) and a core network (not shown). The carrier network's RAN may include various infrastructure, e.g., base stations/cell towers, masts, and the like. The RAN allows the user device 102 to connect to the core network. The core network may comprise the mobile exchange and data network used to manage the connections made to/from/via the RAN. The core network of the carrier network 106 may include a central server, not illustrated in FIG. 1. The central server may effectuate broadband service to a particular area by way of a particular macro cell.

In an example, the access point 104 is owned, controlled, or managed, directly or indirectly (e.g., through a third party) by the carrier network 106. The access point 104 can include carrier network identification information. The carrier network information refers to information that can be used to identify the carrier network. For example, the carrier network identification information can include the name (e.g., AT&T™ or Vodafone™) of the carrier network.

The user device 102 can receive a low energy wireless packet comprising carrier network identification information from the low energy wireless broadcast enabled access point 104 of the carrier network 106. In an example, the carrier network identification information can include the name of the carrier network 106. In an example, the low energy wireless broadcast enabled access point 104 includes an access point 104 with a BLE beacon.

In an example, the low energy wireless packet can include a BLE packet, and the carrier network identification information can be present in the BLE packet. In an example, the BLE packet can include a BLE advertisement packet. As used herein, a "BLE advertisement packet" refers to a data packet used by a BLE-capable device to broadcast information to other devices.

Figure 2:
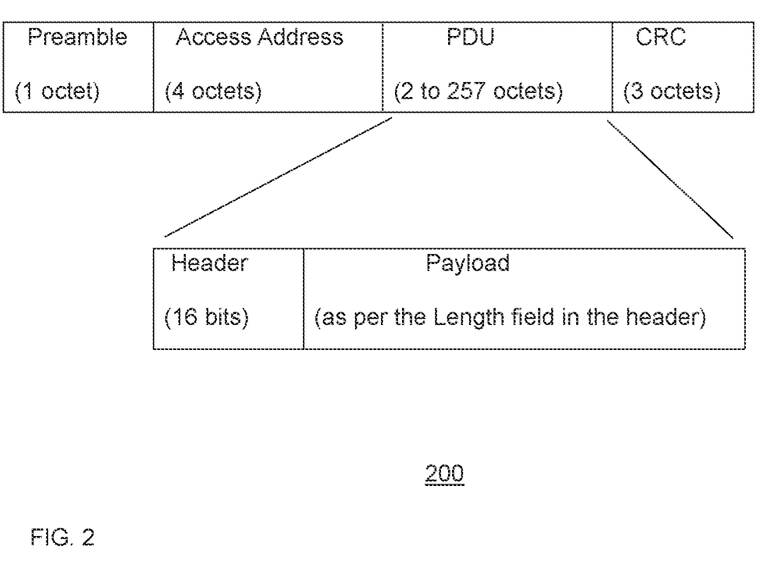
FIG. 2 illustrates a structure of a Bluetooth Low Energy (BLE) packet, according to some examples.

In an example, the carrier network identification information is present in a Protocol Data Unit (PDU) of a BLE advertisement packet. As used herein, a "protocol data unit (PDU)" refers to a single unit of information transmitted among peer entities of a computer network. It is composed of protocol-specific control information and user data. FIG. 2 illustrates the structure of a BLE packet, according to some examples.

In response to receiving a low energy wireless packet, the user device 102 can determine whether the carrier network identification information in the low energy wireless packet matches with carrier network information on the user device 102. In an example, the carrier network information can be present in a SIM on the user device 102. In an example, to carry out the aforesaid determination, the user device 102 can extract the carrier network identification information from the low energy wireless packet. The user device 102 extracts the carrier network information from a SIM on the user device 102. The user device 102 then compares the carrier network identification information with the carrier network information on the user device 102.

In an example, the determination can include the user device 102 to extract a name of the carrier network 106 from both the carrier network identification information and the carrier network information. The user device 102 then compares the names of the carrier network 106 extracted therefrom.

In response to a determination that the carrier network identification information (e.g., name of the carrier network) in the low energy wireless packet matches with carrier network information (e.g., name of the carrier network) on the user device 102, the user device 102 provides a notification message to activate a wireless local area network capability on the user device 102. The wireless local area network capability refers to the functionality of the user device 102 that allows the user device 102 to connect to a wireless local area network (e.g., Wi-Fi). In an example, the notification message is provided on a display coupled to the user device 102. The notification message can include a text, image, audio, or video message.

In response to the notification message, the wireless local area network capability on the user device 102 can be activated. In example, a user can activate the wireless local area network capability via an input. The input can be tactile input, biometric input (e.g., facial recognition), audio input, or video input.

In response to a determination that the wireless local area network capability on the user device 102 is activated, the user device 102 can establish a network connection with the low energy wireless broadcast enabled access point 104 of the carrier network 106 through the wireless local area network capability. In an example, the wireless local area network capability includes a functionality to connect to a Wi-Fi network. In such a case, in response to a determination that the Wi-Fi capability on the user device 102 is activated, the user device 102 can establish a network connection with a Wi-Fi network of the carrier network 106.

In an example, establishing a network connection with the low energy wireless broadcast enabled access point 104 of the carrier network 106 includes the user device 102 to extract subscriber identification information from a SIM on the user device 102. The user device 102 then authenticates the subscriber identification information with the low energy wireless broadcast enabled access point 104 of the carrier network 106 via, for example, the EAP Authentication and Key Agreement (EAP-AKA) method.

The EAP-AKA is an EAP method for authentication and session key distribution that uses Authentication and Key Agreement (AKA) mechanism. AKA is based on challenge-response mechanisms and symmetric cryptography. In an example, AKA can run in a UMTS Subscriber Identity Module (USIM).

In the EAP-AKA method, the user device 102 (or the identity module present therein (e.g., SIM) and an authentication server) agree on a shared authentication key beforehand. The authentication server sends an EAP-Request message to the user device 102. The user device 102 responds with an EAP-Response message which includes the user device's Network Access Identifier (NAI). The NAI is used in the following step as an input parameter to generate an authentication vector. During the authentication process, the authentication server produces an authentication vector based on an authentication key, a sequence number, or a network name. The authentication vector contains a random part (RAND), an authenticator part (AUTN) used for authenticating the carrier network 106 to the user device 102, and other keys. The RAND, AUTN, and the network name are delivered to the user device 102 via an EAP-Request message. The user device 102 verifies the AUTN, based on the authentication key and the sequence number. If the AUTN is valid and the sequence number used to generate AUTN is within the correct range, the user device 102 produces an authentication result (RES) and sends it to the authentication server via an EAP-Response message. The authentication server verifies the RES received from the user device 102. If the results are correct, the authentication server sends an EAP success message to the user device 102. Upon successful authentication, the user device 102 is authorized to access the carrier network 106.

Once a network connection with the low energy wireless broadcast enabled access point 104 of the carrier network 106 is established, the user device 102 can access a wireless local area network of the carrier network 106 via the network connection. In an example, the wireless local area network includes a Wi-Fi network of the network carrier. After the network connection is established, the user device 102 can, for example, call a phone number via the wireless local area network or access the internet via the wireless local area network.

FIG. 2 illustrates the structure of a BLE packet, according to some examples.

BLE defines a single packet format for both advertising and data transmissions. This packet 200 includes four components: preamble (1 octet), access address (4 octets), Protocol Data Unit—PDU (2-257 octets), and Cyclic Redundancy Check (CRC) (3 octets). The "preamble" is used by the receiver for synchronization (e.g., time or frequency). It is a predefined pattern of size 1 byte which is known to the receiver. For all advertising packets, the "access address" is a fixed pattern "0x8E89BED6" in hexadecimal form with a size of 4 octets or 32 bits. For data packets, in one example, the "access address" consists of 32-bit random value generated by the BLE device in "initiating state". The "PDU" includes either "advertising channel PDU" or "data channel PDU". The PDU segment defines whether the BLE packet is an advertising or data packet. In one example, the CRC is 24 bits in size. The CRC is calculated over PDU. CRC is used for error detection of the packet.

In advertising channel PDU, the PDU payload includes the content of the payload of the advertising packet and its maximum size is dependent on the PDU type used. The advertising data includes the information the advertiser (e.g., access point 104) wants to relay to a central device (e.g., user device 102). The advertising PDU packet contains a 16-bit header and a variable-size payload. The advertising header defines 6 segments. The Length field is 6 bits and defines the size of the payload. The Length may be between 6-37 octets and is defined by PDU Type. In an example, the advertising channel PDU of a low energy wireless packet (e.g., a BLE packet) can be used to send carrier network identification information from the low energy wireless broadcast enabled access point 104 of the carrier network 106. The user device 102 can then receive such low energy wireless packet from the low energy wireless broadcast enabled access point 104 of the carrier network 106.

Figure 3:
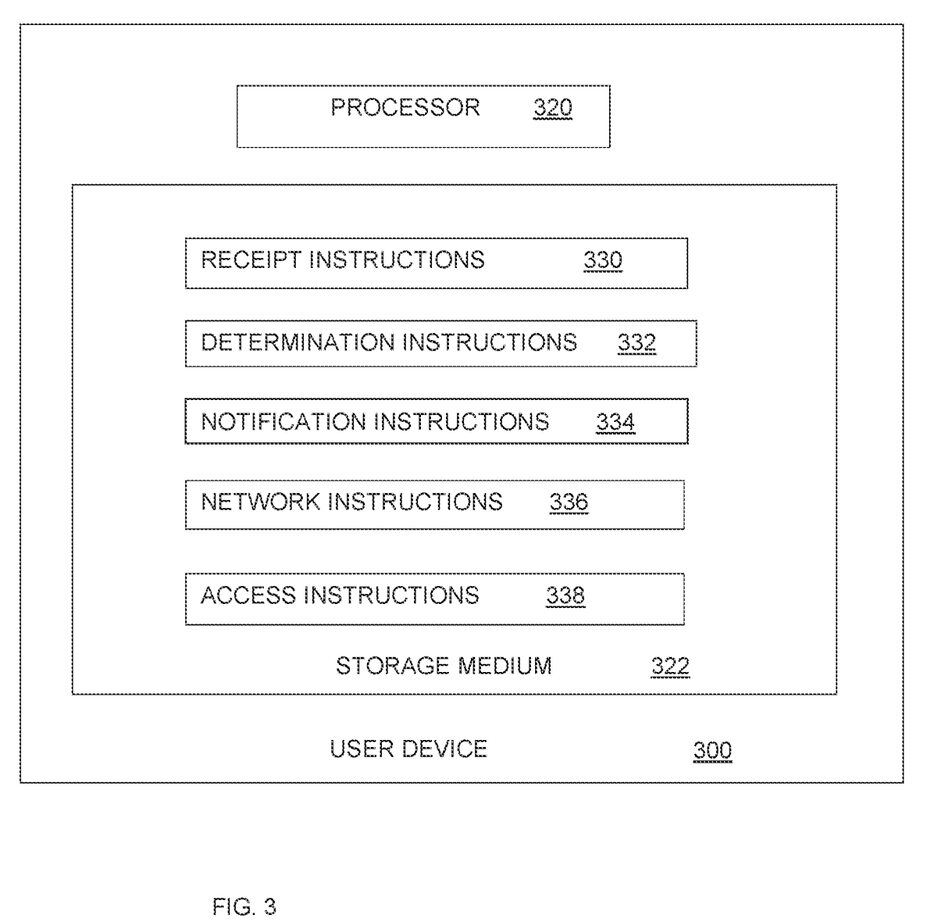
FIG. 3 is a block diagram of a user device, according to some examples.

FIG. 3 illustrates a block diagram of a user device, according to some examples. The user device can be analogous to the user device 102 of FIG. 1, in which like reference numerals correspond to the same or similar, though perhaps not identical components. For the sake of brevity, components or reference numerals of FIG. 3 having the same or similarly described function in FIG. 1 are not being described in connection with FIG. 3. Said components or reference numerals may be considered alike.

The user device 300 can include a processor 320 (or multiple processors) and a storage medium 322. Processor 320 can include one or multiple Central Processing Unit (CPU), microprocessor, programmable gate array, microcontroller, or any other processing logic that interprets and executes machine-readable instructions stored in storage medium 322.

The storage medium 322 can store information and machine-readable instructions executable on the processor 320 to perform various tasks. The storage medium 322 can be Synchronous DRAM (SDRAM), Double Data Rate (DDR), Rambus DRAM (RDRAM), Rambus RAM, etc., or storage memory media such as a floppy disk, a hard disk, a CD-ROM, a DVD, a pen drive, and the like.

In an example, processor 320 executes receipt instructions 330 to receive a low energy wireless packet comprising carrier network identification information from a low energy wireless broadcast enabled access point of a carrier network. In an example, the receipt instructions receive the low energy wireless packet when the user device is at a predefined distance (e.g., in meters) from the low energy wireless broadcast enabled access point. In an example, the receipt instructions receive the low energy wireless packet at a location where a cellular network of the carrier network is limited in signal strength compared to another location.

Processor 320 executes determination instructions 332 to determine whether the carrier network identification information in the low energy wireless packet matches with carrier network information on the user device. In an example, the determination instructions 332 can include instructions to extract the carrier network identification information from the low energy wireless packet, instructions to extract the carrier network information from a SIM on the user device, and instructions to compare the carrier network identification information with the carrier network information on the user device.

In response to a determination that the carrier network identification information in the low energy wireless packet matches with carrier network information on the user device, processor 320 executes notification instructions 334 to provide a notification message to activate a wireless local area network capability on the user device. In an example, the determination can include the user device 300 to extract a name of the carrier network 106 from both the carrier network identification information and the carrier network information. The user device 300 then compares the names of the carrier network extracted therefrom. If the user device 300 determines that the name of the carrier network in the carrier network identification information and carrier network information is same, processor 320 on the user device 300 can execute notification instructions 334 to generate a notification message on a display coupled to the user device 300 to activate a wireless local area network capability on the user device 300. In an example, the notification instructions 334 include instructions to provide the notification message in text, audio or video format. In response to the notification message, the wireless local area network capability on the user device 300 can be activated. In example, a user can activate the wireless local area network capability via an input. The input can be tactile input, biometric input (e.g., facial recognition), audio input, or video input.

In response to a determination that the wireless local area network capability on the user device is activated, processor 320 executes network instructions 336 to establish a network connection with the low energy wireless broadcast enabled access point of the carrier network through the wireless local area network capability.

In an example, network instructions 336 to establish a network connection with the access point include instructions for the user device to extract subscriber identification information from a SIM on the user device. The user device then authenticates the subscriber identification information with the low energy wireless broadcast enabled access point of the carrier network via, for example, the Extensible Authentication method for Subscriber Identity Module (EAP-SIM) method. EAP-SIM uses a SIM authentication algorithm between the client and an Authentication, Authorization, and Accounting (AAA) server to enable mutual authentication between the client and the network.

In the EAP-SIM method, a supplicant, which is an authentication software on the user's device, associates with an authenticator (e.g., the access point). The authenticator sends an EAP ID-Request to the supplicant. The supplicant responds with an EAP ID-Response, which is passed through the authenticator to a Remote Authentication Dial-In User Service (RADIUS) server. An EAP-SIM plug-in processes the EAP ID-Response to get a subscriber's International Mobile Subscriber Identity (IMSI) number. The EAP-SIM module stores the IMSI and callback function pointer in the authreq extension and calls a Signaling System 7 (SS7) plug-in module's action function. The SS7 module sends a Mobile Application Part (MAP) protocol SendAuthInfo request with the IMSI to the Home Location Register (HLR). The HLR returns to the SS7 plug-in module a MAP SendAuthInfo response including a triplet. The SS7 plug-in maps the response to the appropriate authreq data structure and stores the triplet in the extension. The SS7 plug-in calls the EAP-SIM callback function. The EAP-SIM module uses the triplet to complete a series of EAP-SIM challenges with the supplicant resulting in an EAP-Success. Upon successful authentication, the user device is authorized to access the carrier network.

The processor executes access instructions 338 to access the wireless local area network of the carrier network via the network connection. In an example, access instructions 338 include instructions to call a phone number via the wireless local area network or access the internet via the wireless local area network, after the network connection is established.

Figure 4:
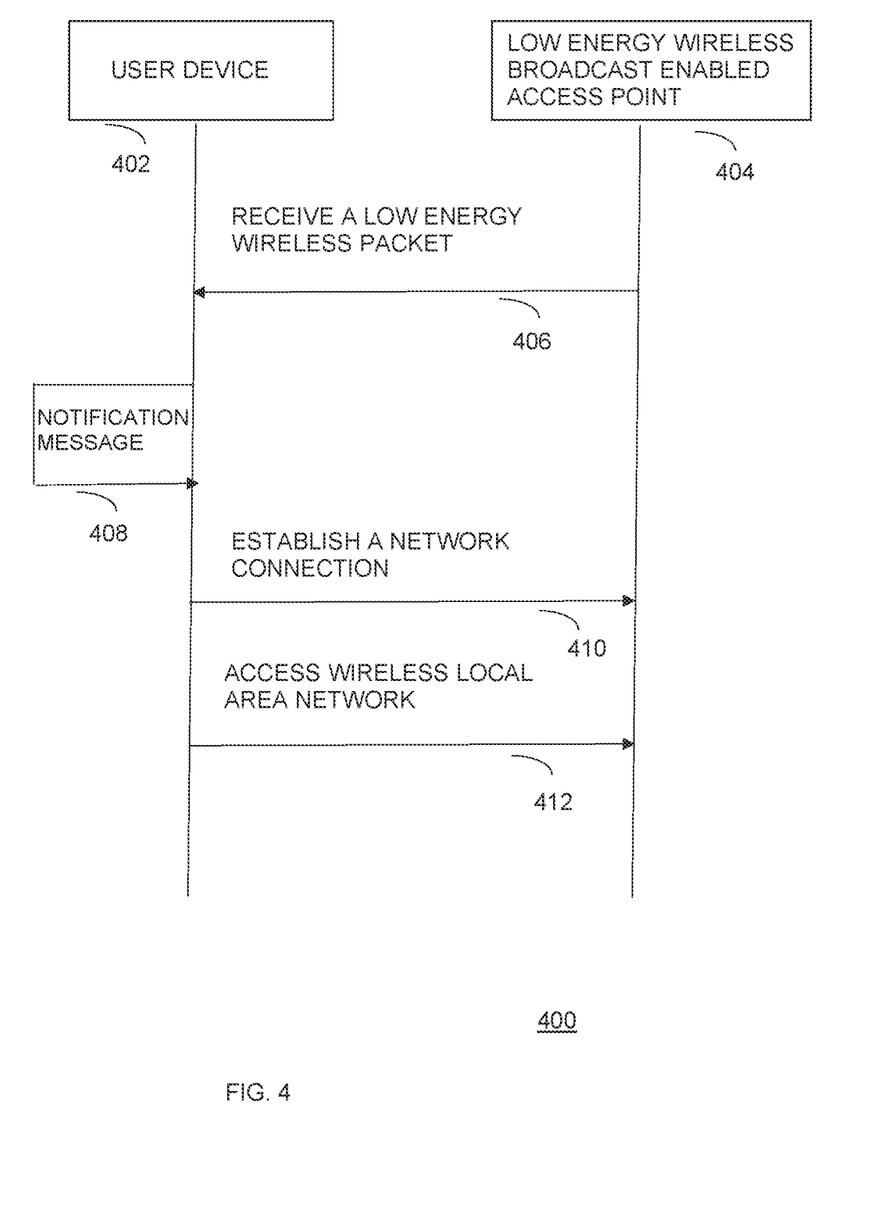
FIG. 4 is a block diagram of a communication flow, according to some examples.

FIG. 4 is a block diagram of a communication flow, according to some examples. In an example, the user device 402 receives 406 a low energy wireless packet comprising carrier network identification information from a low energy wireless broadcast enabled access point 404 of a carrier network. In an example, the carrier network identification information can include the name of the carrier network. In an example, the low energy wireless packet can include a BLE packet, and the carrier network identification information can be present in the BLE packet.

In response to receiving a low energy wireless packet, the user device can determine whether the carrier network identification information in the low energy wireless packet matches with carrier network information on the user device. In an example, to carry out the aforesaid determination, the user device can extract the carrier network identification information from the low energy wireless packet. The user device also extracts the carrier network information (e.g., on a SIM) from the user device. The user device then compares the carrier network identification information with the carrier network information on the user device.

In response to a determination that the carrier network identification information in the low energy wireless packet matches with carrier network information on the user device 402, the user device 402 provides a notification message 408 to activate a wireless local area network capability on the user device 402. If the user device determines that the carrier network identification information matches with the carrier network information, the user device can generate a notification message on a display coupled to the user device to activate a wireless local area network capability on the user device.

In response to a determination that the wireless local area network capability on the user device 402 is activated, the user device 402 establishes 410 a network connection with the low energy wireless broadcast enabled access point 404 of the carrier network through the wireless local area network capability. In an example, establishing a network connection with the low energy wireless broadcast enabled access point of the carrier network includes the user device to extract subscriber identification information from a SIM on the user device. The user device then authenticates the subscriber identification information with the low energy wireless broadcast enabled access point of the carrier network via, for example, the EAP Authentication and Key Agreement (EAP-AKA) method.

Once the network connection is established, the user device can access 412 the wireless local area network of the carrier network via the network connection. In an example, the wireless local area network includes a Wi-Fi network of the network carrier. After the network connection is established, the user device can, for example, call a phone number via the wireless local area network or access the internet via the wireless local area network.

Figure 5:
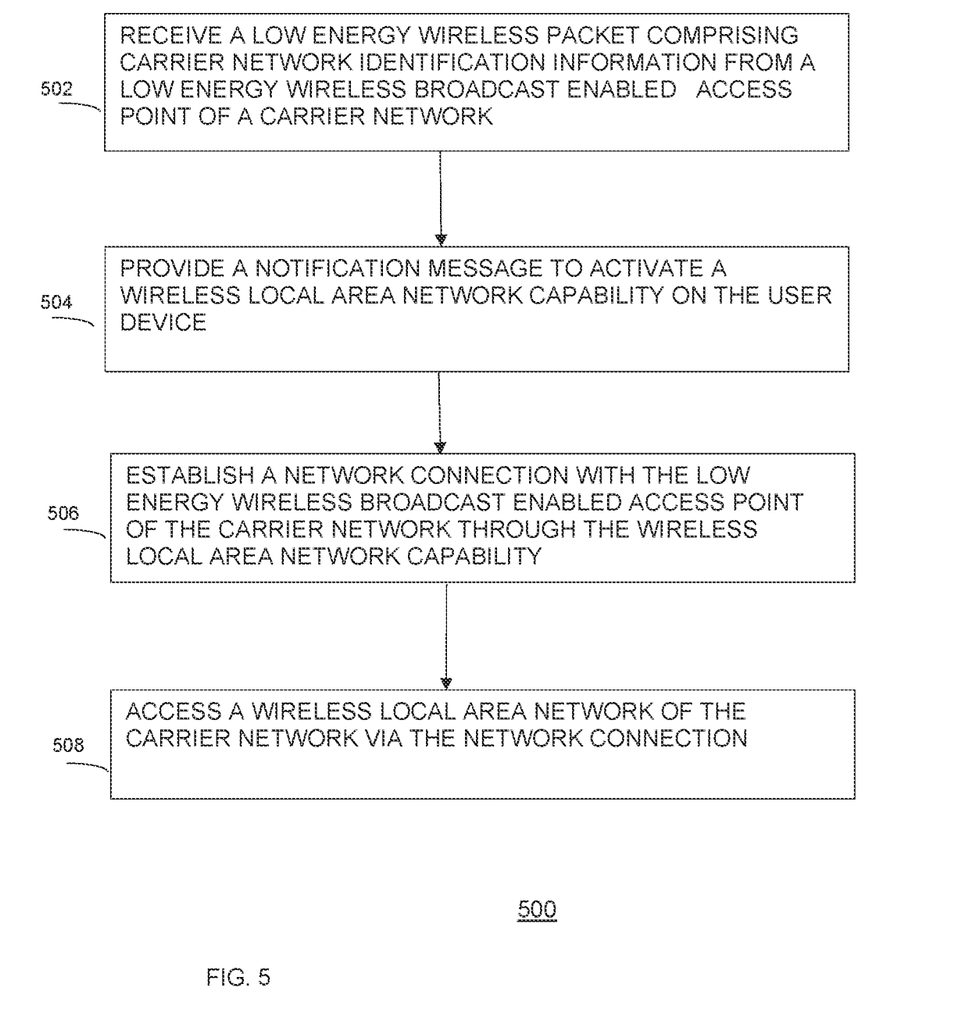
FIG. 5 is a flowchart of a method, according to some examples.

FIG. 5 is a flowchart of method 500, according to some examples. Method 500 can be performed by a user device. For example, method 500 can at least partially be executed on the user device 102 of FIG. 1 or the user device 300 of FIG. 3.

At block 502, method 500 includes receiving, by a user device, a low energy wireless packet comprising carrier network identification information from a low energy wireless broadcast enabled access point of a carrier network. In an example, receiving the low energy wireless packet comprises the low energy wireless packet over a Bluetooth connection between the user device and the low energy wireless broadcast enabled access point.

In response to determining that the carrier network identification information in the low energy wireless packet matches with carrier network information on the user device, at block 504, method 500 includes providing, by the user device, a notification message to activate a wireless local area network capability on the user device. In an example, the determination includes extracting the carrier network identification information from the low energy wireless packet, extracting the carrier network information from a SIM on the user device, and comparing the carrier network identification information with the carrier network information on the user device. In an example, the notification message is provided as text, audio, or video.

In response to determining that the wireless local area network capability on the user device is activated, at block 506, method 500 includes establishing, by the user device, a network connection with the low energy wireless broadcast enabled access point of the carrier network through the wireless local area network capability. In an example, the determination includes receiving a user input to activate the wireless local area network capability on the user device. And in response to the user input, activating the wireless local area network capability on the user device.

At block 508, method 500 includes accessing, by the user device, a wireless local area network of the carrier network via the network connection. In an example, accessing the wireless local area network includes calling a phone number via the wireless local area network or accessing the internet via the wireless local area network.

Figure 6:
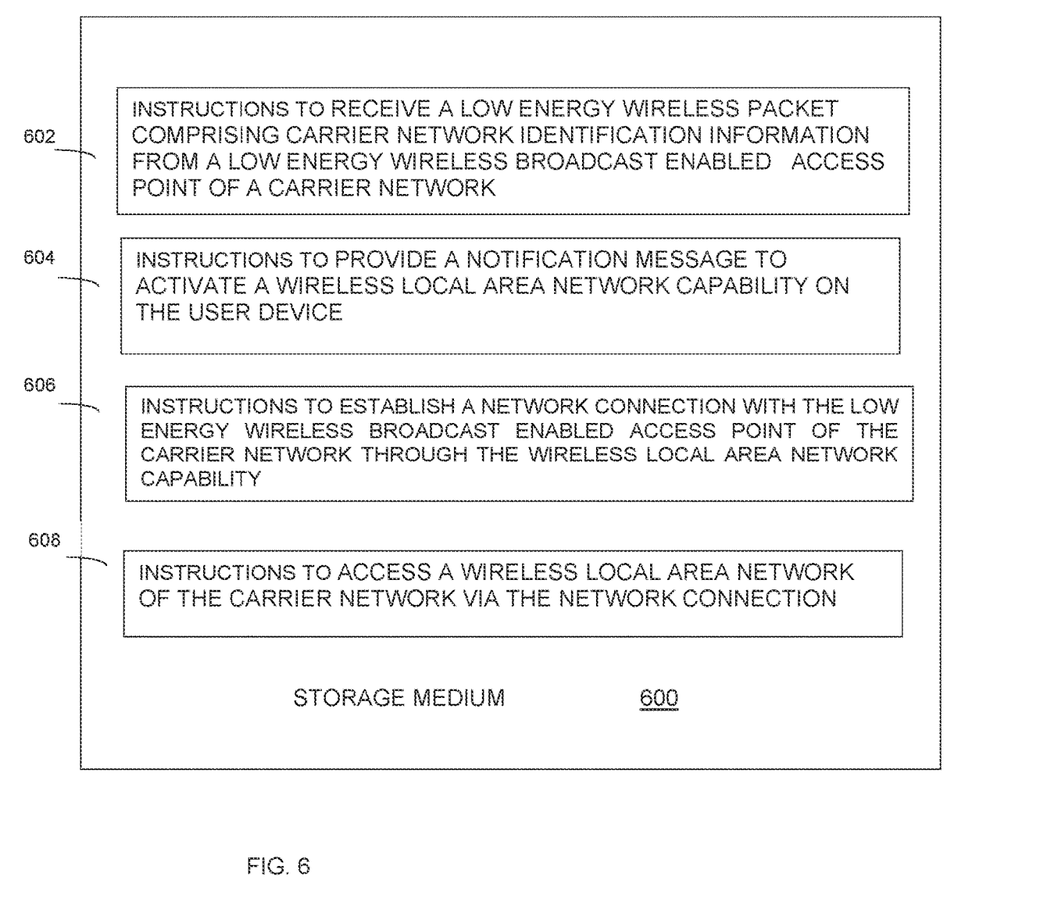
FIG. 6 is a block diagram of a storage medium storing machine-readable instructions, according to some examples.

FIG. 6 is a block diagram of a non-transitory machine-readable or computer-readable storage medium 600 storing machine-readable instructions that upon execution cause a user device to perform various tasks. The user device can include the user device 102 of FIG. 1 or the user device 300 of FIG. 3.

The machine-readable instructions include instructions 602 to receive, by a user device, a low energy wireless packet comprising carrier network identification information from a low energy wireless broadcast enabled access point of a carrier network. In response to a determination that the carrier network identification information in the low energy wireless packet matches with carrier network information on the user device, the machine-readable instructions include instructions 604 to provide a notification message to activate a wireless local area network capability on the user device.

In response to a determination that the wireless local area network capability on the user device is activated, the machine-readable instructions include instructions 606 to establish a network connection with the low energy wireless broadcast enabled access point of the carrier network through the wireless local area network capability. The machine-readable instructions include instructions 608 to access a wireless local area network of the carrier network via the network connection.

For simplicity of explanation, the example method of FIG. 5 is shown as executing serially, however, it is to be understood and appreciated that the present and other examples are not limited by the illustrated order. The example systems of FIGS. 1, 3, 4, and 6, and the method of FIG. 5 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general-purpose or special-purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions, and which can be accessed by a general-purpose or special-purpose computer. The computer-readable instructions can also be accessed from memory and executed by a processor.

It should be understood that the above-described examples of the present solution are for illustration. Although the solution has been described in conjunction with a specific example thereof, numerous modifications may be possible without materially departing from the teachings and advantages of the subject matter described herein. Other substitutions, modifications, and changes may be made without departing from the spirit of the present solution. All of the features disclosed in this specification (including any accompanying claims, abstract, and drawings), and/or all of the steps of any method or process so disclosed, may be combined in any combination, except combinations where at least some of such features and/or steps are mutually exclusive.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on one claim, the disclosure of various implementations includes each dependent claim in combination with every other claim in the claim set.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

As used herein, the articles "a" and "an" are intended to include one or more items and may be used interchangeably with "one or more." Further, as used herein, the article "the" is intended to include one or more items referenced in connection with the article "the" and may be used interchangeably with "the one or more." Also, as used herein, the terms "has," "have," "having," or the like are intended to be open-ended terms. As used herein, the term "includes" is intended to mean "includes but not limited to", and the term "including" is intended to mean "including but not limited to". Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The invention claimed is:

1. A method comprising:
  receiving, by a user device, a wireless packet comprising carrier network identification information from a low energy wireless broadcast enabled access point of a carrier network;
  in response to determining that the carrier network identification information in the wireless packet matches with carrier network information on the user device, providing, by the user device, a notification message to activate a wireless local area network capability on the user device;
  in response to determining that the wireless local area network capability on the user device is activated, establishing, by the user device, a network connection with the low energy wireless broadcast enabled access point of the carrier network through the wireless local area network capability; and
  accessing, by the user device, a wireless local area network of the carrier network via the network connection.

2. The method of claim 1, wherein a cellular network of the carrier network is limited in signal strength compared to the wireless local area network of the carrier network.

3. The method of claim 1, further comprising:
  determining, by the user device, whether the carrier network identification information in the wireless packet matches with the carrier network information on the user device.

4. The method of claim 3, wherein determining comprises:
  extracting, by the user device, the carrier network identification information from the wireless packet;
  extracting, by the user device, the carrier network information from a Subscriber Identification Module (SIM) on the user device; and
  comparing, by the user device, the carrier network identification information with the carrier network information on the user device.

5. The method of claim 1, wherein establishing comprises:
  extracting, by the user device, subscriber identification information from a SIM on the user device; and
  authenticating, via the user device, the subscriber identification information with the low energy wireless broadcast enabled access point of the carrier network via EAP Authentication and Key Agreement (EAP-AKA) method.

6. The method of claim 1, further comprising:
  receiving, by the user device, a user input to activate the wireless local area network capability on the user device; and
  in response to the user input, activating, by the user device, the wireless local area network capability on the user device.

7. The method of claim 1, wherein receiving comprises:
  receiving the wireless packet over a Bluetooth connection between the user device and the low energy wireless broadcast enabled access point.

8. The method of claim 1, further comprising:
  disabling, by the user device, a cellular network connection with the carrier network.

9. The method of claim 8, wherein receiving comprises:
  receiving a BLE packet comprising the carrier network identification information from the low energy wireless broadcast enabled access point of the carrier network.

10. The method of claim 1, wherein establishing the network connection with the access point of the carrier network through the wireless local area network capability comprises:
  extracting, by the user device, subscriber identification information from a SIM on the user device; and
  authenticating, via the user device, the subscriber identification information with the low energy wireless broadcast enabled access point of the carrier network via Extensible Authentication method for Subscriber Identity Module (EAP-SIM) method.

11. A user device comprising:
a processor; and
a non-transitory storage medium storing instruction that, when executed by the processor, cause the user device to:
receive a wireless packet comprising carrier network identification information from a low energy wireless broadcast enabled access point of a carrier network where a cellular network of the carrier network is limited in signal strength compared to a wireless local area network of the carrier network;
in response to a determination that the carrier network identification information in the wireless packet matches with carrier network information on the user device, provide a notification message to activate a wireless local area network capability on the user device;
in response to a determination that the wireless local area network capability on the user device is activated, establish a network connection with the low energy wireless broadcast enabled access point of the carrier network through the wireless local area network capability; and
access the wireless local area network of the carrier network via the network connection.

12. The user device of claim 11, wherein the wireless packet includes a low energy wireless packet used by a low energy wireless broadcast device for data transmission.

13. The user device of claim 11, wherein the instructions, when executed by the processor, further cause the user device to call a phone number via the wireless local area network.

14. The user device of claim 11, wherein the instructions, when executed by the processor, further cause the user device to access internet via the wireless local area network.

15. A non-transitory machine-readable storage medium comprising instructions that upon execution cause a user device to:
receive a wireless packet comprising carrier network identification information from a low energy wireless broadcast enabled access point of a carrier network;
in response to a determination that the carrier network identification information in the wireless packet matches with carrier network information on the user device, provide a notification message to activate a wireless local area network capability on the user device;
in response to a determination that the wireless local area network capability on the user device is activated, establish a network connection with the low energy wireless broadcast enabled access point of the carrier network through the wireless local area network capability; and
access a wireless local area network of the carrier network via the network connection.

16. The storage medium of claim 15, further comprising instructions that upon execution cause the user device to:
extract subscriber identification information from a SIM on the user device; and
authenticate the subscriber identification information with the low energy wireless broadcast enabled access point of the carrier network via EAP-AKA method.

17. The storage medium of claim 15, wherein the wireless packet includes a BLE advertisement packet.

18. The storage medium of claim 17, wherein the carrier network identification information is present in a Protocol Data Unit (PDU) of the BLE advertisement packet.

19. The storage medium of claim 15, wherein the carrier network identification information and carrier network information include a name of the carrier network.

20. The storage medium of claim 15, wherein the low energy wireless broadcast enabled access point includes a BLE beacon.

* * * * *